Figure 6:
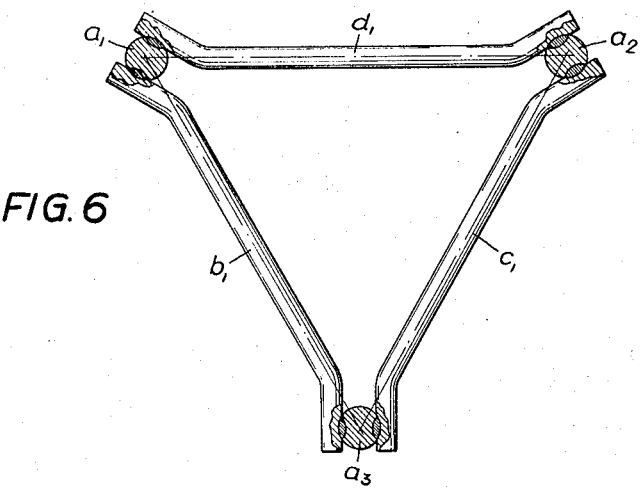

Oct. 10, 1967  E. CVIKL  3,345,793
THREE-DIMENSIONAL LOAD-SUPPORTING STRUCTURES AND
METHODS OF PRODUCING SUCH STRUCTURES
Filed July 6, 1964  4 Sheets-Sheet 1
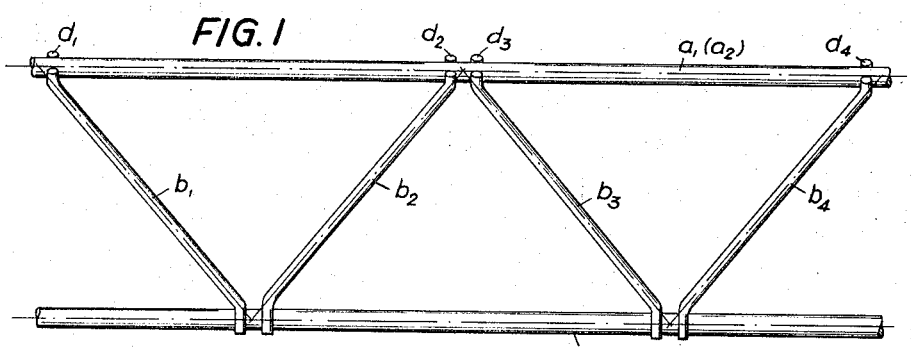
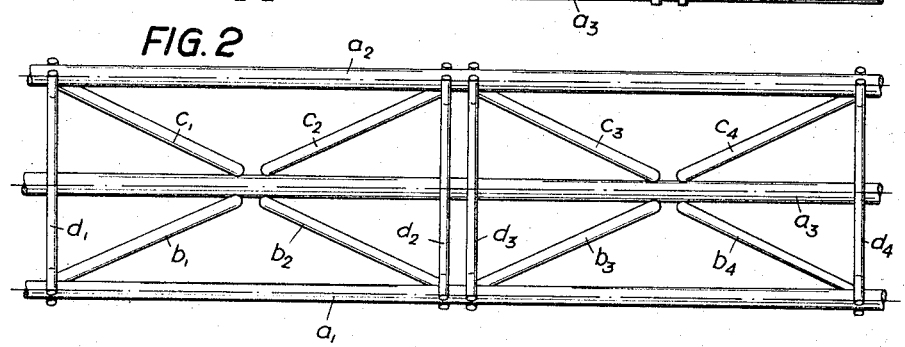
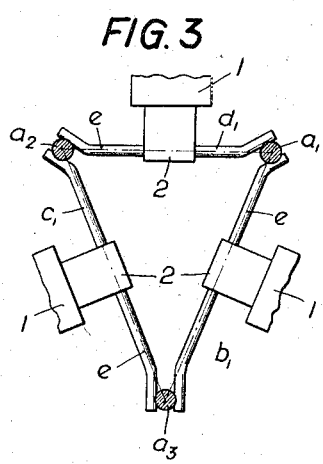
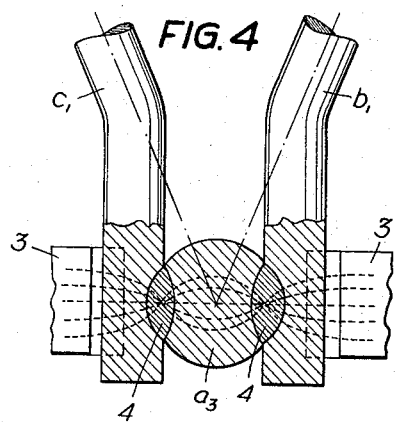
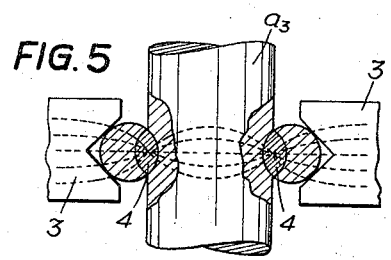
INVENTOR.
Emst Cvikl
BY Nolte & Nolte
Attorneys INVENTOR.
Ernst Cvikl
BY Nolte & Nolte
Attorneys Oct. 10, 1967 E. CVIKL 3,345,793
THREE-DIMENSIONAL LOAD-SUPPORTING STRUCTURES AND
METHODS OF PRODUCING SUCH STRUCTURES
Filed July 6, 1964
4 Sheets-Sheet 4

INVENTOR.
Ernst Cvikl
BY Holte & Holte
Attorneys ated Oct. 10, 1967

3,345,793
THREE-DIMENSIONAL LOAD-SUPPORTING STRUCTURES AND METHODS OF PRODUCING SUCH STRUCTURES
Ernst Cvikl, 23/12 Wickenburggasse, Vienna VIII, Austria
Filed July 6, 1964, Ser. No. 380,494
Claims priority, application Austria, July 10, 1963,
A 5,509/63
12 Claims. (Cl. 52—655)

The present invention relates to three-dimensional load-supporting structures and methods of producing such structures.

It is known to produce lattice girders, in particular beams for supporting the floors of buildings, from steel rod which is wound on reels and is withdrawn therefrom step-by-step. In these griders one of the elements is shaped intermittently to form a zig-zag lattice, and in the stationary pause between two periods of movement the bent sections of such elements are welded to rod members which are placed against them, and which form the upper and the lower longitudinal members or booms. Beams or girders of a predetermined length are cut off the structures which are produced continuously in this manner. The lattice structures produced in this manner are preferably produced as flooring supports having substantially a T- or V-shaped cross-section and therefore do not represent a three-dimensional lattice work, having at least a triangular cross-section and being made from rods or bars.

In a known lattice girder longitudinally extending rods serving as upper and lower booms are connected by means of loops which are open on one side and which form diagonals between the upper and the lower booms so that the girder has substantially only two planes which are capable of carrying the load and which have been statically determined, but which do not lead to a force-transmitting connection.

In order to produce continuously three-dimensional lattice girders which have three booms extending parallel to each other and loop-like diagonal members interconnecting them, wherein bent centre portions of the diagonal members are welded to one boom and wherein the free ends of each diagonal member are bent perpendicularly to another boom, an apparatus is known which consists of an intermittently operating feed device for the booms, a device for supplying the diagonal members, and a subsequent spot welding device for connecting the booms to the diagonal members at the points of contact thereof.

The lattice girders produced in this manner are open on one side of the triangle so that these girders also have only two sides which are capable of supporting a load and which have been statically determined, for which reason they are merely used as reinforcement for the beams of concrete beam flooring.

Finally a method for continuously producing lattice firders of rod material is known in which the boom material and the lattice rod material for forming a lattice section are taken from a storage means and are advanced at different step lengths in an operation which comprises simultaneously onward movement of the finished portion of the lattice girder, and wherein operating steps occur between the feed cycles in which the lattice rod material is inserted into a lattice rod jig forming open loops, and the lattice rods and booms are connected to each other to form the girder. The lattice girders produced in this manner are admittedly three-dimensional; however they are open upwardly so that they do not form a three-dimensional load-supporting structure which satisfies the requirement for stiffness and stability in all directions.

The invention relates to a three-dimensional load-supporting structure consisting of unidirectionally disposed booms and lattice rods extending from boom to boom, crossing same and having any suitable rod-like section or profile (called "profiled rods" hereinafter) and to a method of producing the three-dimensional load-supporting structure. An object of the invention is to construct the three-dimensional load-supporting structures of profiled rods in such manner and with such configuration that automatic resistance welding with completely automatic operation can be used for producing them in continuous plants, wherein the lattice rods can be dimensioned in accordance with the varying static requirements and a satisfactory stability of the load-supporting structure is ensured in all lateral planes. The stability and stiffness of the construction is of decisive significance in particular for light constructional methods, for which reason three-dimensional load-supporting structures are used since two-dimensional load-supporting structures are generally too unstable.

However, the disposition of the lines of force is of decisive significance in this case, so that an optimum transmission of all forces within the three-dimensional load-supporting structure is ensured. Thus three main requirements must be fulfilled by the construction of three-dimensional load-supporting structures according to the invention from profiled lattice rods, namely in respect of the joining of the latter, in respect of the disposition of the lines of force in the lattice rods, and finally in respect of the matching of the dimensions of the lattice rods to the static requirements of the load-supporting structures.

A three-dimensional load-supporting structure produced in accordance with the invention is characterised in that both ends of the lattice rods to be connected to and crossing the booms of adjacent sides of the load-supporting structure are bent parallel to each other and perpendicular to the booms for the purpose of providing a close contact in the region of their connecting points with the booms, resulting in an optimum current concentration when the welding electrodes are applied, and that the centre axes of the portions of the lattice rods lying between the booms intersect at least approximately those of the booms. Owing to this construction it is possible to use automatic resistance pressure welding (projection welding) between booms and lattice rods at the connecting points thereof and to provide a perfect connection in respect of the disposition of the lines of force, which is impossible in the known methods mentioned above.

The known three-dimensional lattice structures or lattice girders of profiled rods were based in respect of the connection between the individual rods mainly on fusion welding, in particular arc welding. In this case the rods could be placed into the axes of the material thereof and could be prepared so that suitable space was available for providing the weld seam (mainly gap V, or K seams). This kind of joining the rods however cannot be effected automatically and therefore involves high production costs.

In order to produce panels for three-dimensional load-supporting structures of profiled rods by the use of resistance pressure welding, booms were connected to zig-zag shaped lattice rods where the former rested on the outside of the slightly flattened corners of the latter. In this method however continuously uniform dimensioning of the lattice rods is necessary.

In accordance with the present invention a load-supporting structure consists of longitudinal members or booms and interconnecing lattice rods in which the ends of the lattice rods are disposed transversely of the booms and are welded to them by resistance pressure welding, and the end parts of the lattice rods are bent in such manner that when welded to the booms the intermediate parts of the lattice rods are disposed with their centre axes approximately intersecting the centre axes of the booms.

In the arrangement according to the invention, the lattice rods have a cross-section which may vary on each side of the load-supporting structure to be produced with a sequence which corresponds to the static requirements thereof. Owing to this construction the three-dimensional load-supporting structure is utilised statically to a maximum extent whilst the material is used economically.

The invention comprises also a method of producing such load-supporting structures and consists in that the lattice rods are held ready for use outside the booms on each side of the load-supporting structure to be produced, the rods having a cross-sectional dimension suitable for, and being arranged in a sequence corresponding to the various static requirements, and that during the intermittent advance of the booms the rods are held against the booms in this sequence so that their ends, which are bent parallel to each other, lie perpendicularly across the booms and are connected to the booms under automatic control by means of projection welding with a single electrode application and at a pressure which is suitable for the varying cross-sectional dimensions.

Figure 7:
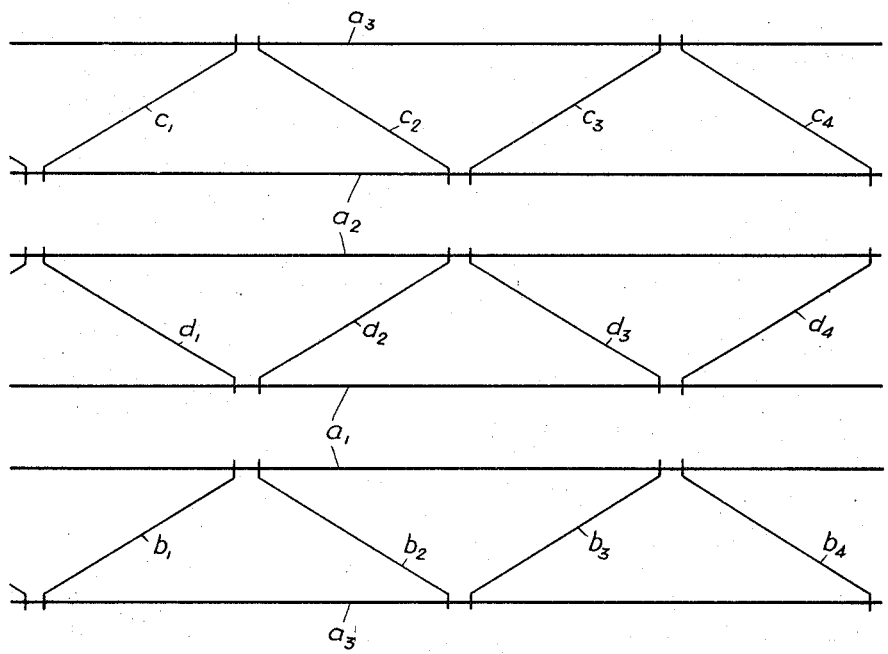

A plurality of embodiments of three-dimensional load-supporting structures produced in accordance with the invention is illustrated by way of example in the accompanying drawings, in which:

FIGS. 1 to 3 illustrate a three-dimensional load-supporting structure in side view, plan and cross-section, respectively, FIGS. 4 and 5 illustrate on a larger scale the joint between the lower boom and the adjacent lattice rods in two cross-sections perpendicular to each other, FIGS. 6 and 7 illustrate a further embodiment of the three-dimensional load-supporting structure according to the invention in cross-section and in three side views, respectively, the latter considered perpendicularly to the lattice rods, wherein for clarity the lattice rods and the associated booms are shown folded away from each other, and FIGS. 8 and 9, 10 and 11, and 12 and 13 respectively are further embodiments of the three-dimensional load-supporting structure, each in side view and in plan.

The three-dimensional load-supporting structure illustrated in FIGS. 1 to 3 consists of three booms $a1$, $a2$, $a3$, which correspond in their mutual distance to the required cross-sectional form of the load-supporting structure and which are guided parallel to each other by means of guide devices not illustrated, e.g. guide rollers, and are displaced in their longitudinal direction step-by-step by means of a suitable feed device.

The structure consists further of the lateral lattice or filler rods $b1$, $b2$, $b3$ . . . and $c1$, $c2$, $c3$ . . . and the upper lattice rods $d1$, $d2$, $d3$ . . . The ends of the lattice rods to be connected to and crossing the booms $a1$, $a2$, $a3$, of adjacent sides of the load-supporting structure are bent in a direction parallel to each other, as may be seen from FIG. 3. The centre axes $e$ of the portions of the lattice rods lying between the booms intersect the centre axes of the booms whereby a perfect force transmission between the rods and booms is ensured when the three-dimensional load-supporting structure is stressed. The lattice rods are withdrawn from storage containers 1 by means of holders 2, which guide them to the booms in the required attitude and embrace them at their ends which are bent in the same direction.

In this case the lower ends of the rods $b1$, $b2$, . . . $c1$, $c2$ . . . and $b3$, $b4$ . . . $c3$, $c4$ . . . are a small distance apart and are connected to the lower boom $a3$ the rods extending in opposite directions diagonally to the upper booms $a1$ and $a2$, respectively to which they are connected, together with the similarly directed ends of the lattice rods $d1$, $d2$, $d3$ . . . crossing the upper booms perpendicularly. The connection between the lattice rods and the booms is effected by means of electrodes 3 (FIGS. 4 and 5) which are movable relatively to each other and which are arranged as resistance pressure welding tools in the region of the connecting points between booms and lattice rods.

Owing to the fact that the ends of the lattice rods engage the booms only at localised points, a current concentration is obtained as indicated in FIGS. 4 and 5, by broken lines, the electrodes 3 being urged towards each other under high pressure and achieving thereby a satisfactory resistance pressure weld, a so-called projection weld. The bead-like parts 4 indicate the places of fusion of the booms with the lattice rods in the region of the current concentration and indicate also clearly the intimate connection between the rods at the joints. Owing to the cross-wise placing, according to the invention, of the ends of the lattice rods relatively to the booms, there is obtained not only a high grade fixing or joining of the rods, but the possibility of operating with a relative low welding current and low-pressure of the electrodes 3, without the production of blow-holes and with the minimum adverse effect on the work material.

It may be mentioned further that the three-dimensional load-supporting structure may be composed of rod members of different grades of material whereby further economic advantages can be obtained.

The embodiment of the three-dimensional load-supporting structure according to FIGS. 6 and 7 differs from the embodiment described above in that the cross-section forms an equilateral triangle and that the lattice rods $d1$, $d2$, $d3$ are arranged similarly as the other lattice rods in a direction obliquely to the upper booms $a1$ and $a2$ instead of lying perpendicularly thereto. The booms and lattice rods are provided with the same references as in the embodiment described above. The place of application of the electrodes is always indicated by arrows. This embodiment is characterized by particular simplicity of configuration and uniformity of all lattice rods.

Figure 8:
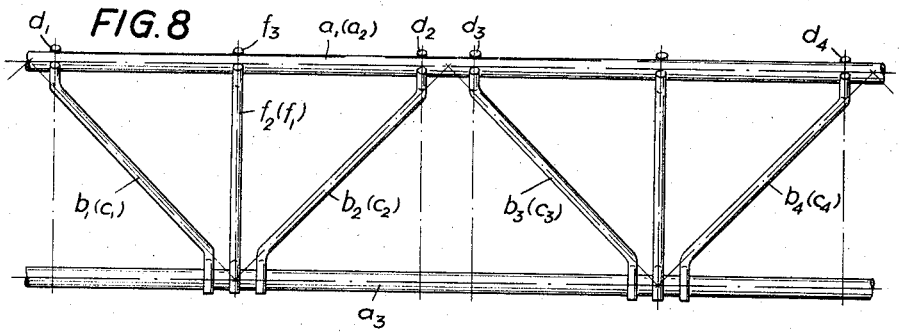
Figure 9:
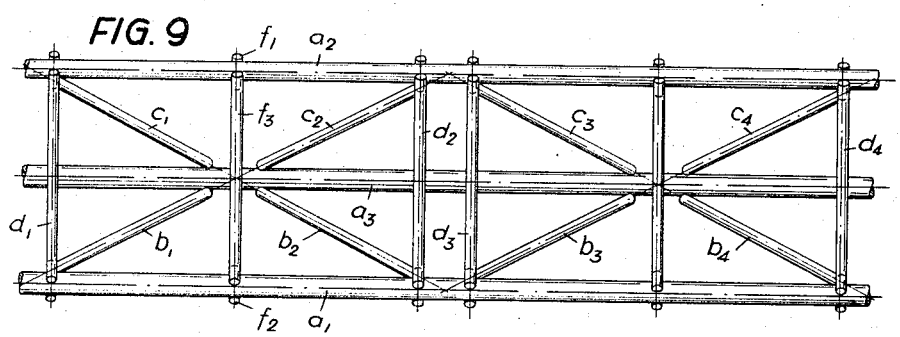

In the load-supporting structure according to FIGS. 8 and 9, lattice rods $f1$, $f2$, $f3$ laying in one plane are provided additionally between the lattice rods $b1$ and $b2$ and $c1$ and $c2$ which are inclined against the boom $a3$ in mutually opposite directions and similarly between the subsequent pairs of lattice rods $b3$ and $b4$ and $c3$ and $c4$.

Figure 10:
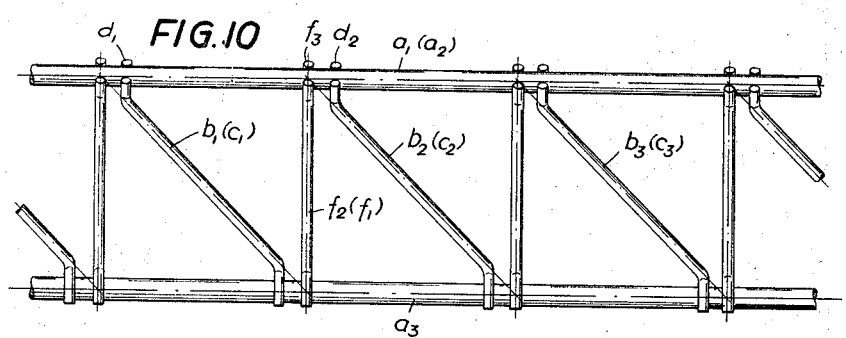
Figure 11:
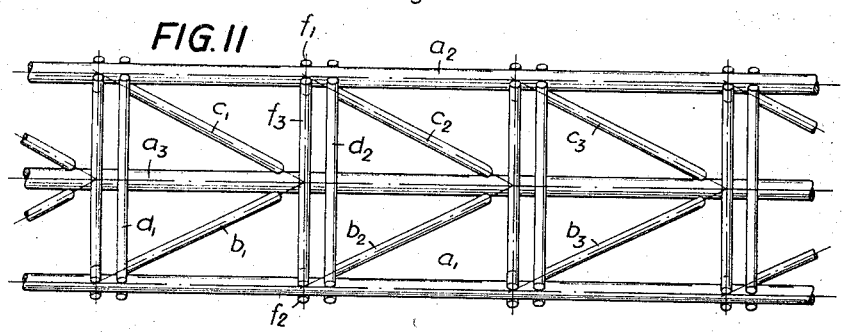

In the embodiment according to FIGS. 10 and 11 successive lattice rods are connected to the upper booms and the lower booms in an N-shaped arrangement.

Figure 12:
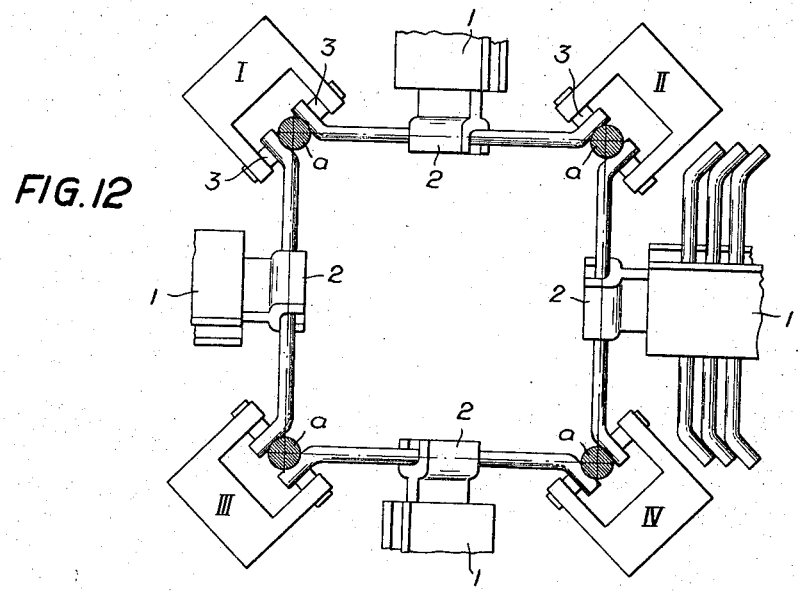
Figure 13:
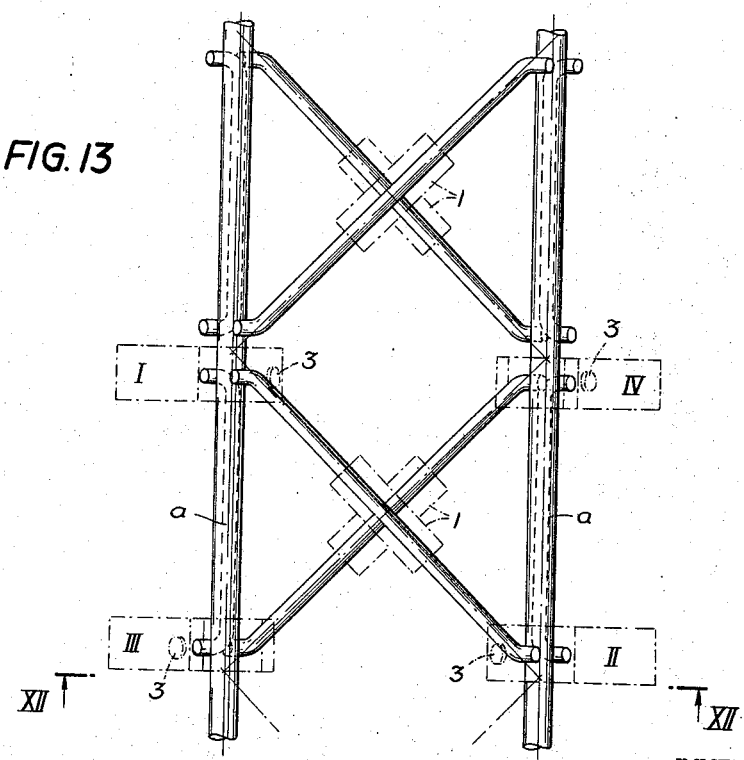

FIGS. 12 and 13 illustrate an embodiment of a three-dimensional load-supporting structure, having four lateral planes, wherein the axes of the booms $a$ lie, e.g. in the corners of a square considered in cross-section and the lattice rods of opposite sides extend in opposite directions. The electrodes 3 for joining the booms and lattice rods are offset against each other, as may be seen from FIG. 13 and are disposed at the locations at which the ends of the lattice rods are connected to the booms so that on each side of the three-dimensional load-supporting structure simultaneously always one lattice rod is connected to the boom by projection welding, the lattice rods being supplied from the storage containers 1, which are indicated diagrammatically and guided to the booms by means of the holders 2 and held there until the welded connection has been effected.

It is evident that in place of the square cross-sectional configuration of the three-dimensional load-supporting structure, alternatively rectangular, trapezoidal, or even polygonal cross-sections can be selected, wherein the arrangement, construction, and configuration of the profiled rods enables the load-supporting structures to be produced according to the method of the invention by continuous production methods.

Control of the welding current may be effected by means of electronic control apparatus (ignitron timers) I–IV, and the arrangement may be provided with printed or perforated card programs so that the sequence of the welding process occurs completely automatically.

The construction of three-dimensional load-supporting structures from profiled rods in accordance with the invention is possible in a very great variety of arrangements of booms and lattice rods, wherein the position, inclination and direction of the lattice rods relatively to each other and to the booms is independent of the configuration.

The supply of the individual lattice rods to each side of the load-supporting structure from storage containers in which the lattice rods are already suitably pre-formed in respect of their bent ends, makes it possible not only to produce all sides of the load-supporting structures continuously, but also to use additionally lattice rods which, as to their cross-sectional dimensioning, are kept in the storage containers ready for use and in a sequence in accordance with the static requirements of the load-supporting structures. They are successively guided to the booms by the holders and are held in the required position relatively to the booms until the welded connection by projection welding has been effected, whereupon stepwise feed movement occurs to the next welding place between the rods and booms of the load-supporting structure. The lattice rods of varying cross-sections are stored in the containers 1 in accordance with a predetermined plan, e.g. by inserting the lattice rods in the required sequence by means of selection with perforated cards.

Alternatively the welding electrodes may suitably be disposed so that two adjacent lateral pairs of lattice rods, e.g. b1, c1 and b2, c2 (FIGS. 1 to 3) are connected to their upper lattice rods d1, d2 and simultaneously to the booms a1, a3 by means of projection welding in which case the stepwise feed of the booms is always of the same magnitude.

Thus, it will be seen that with the structure of the invention provides a rod assembly composed of a plurality of interconnected rods which surround an elongated space of uniform polygonal cross section defined by a plurality of longitudinal planes which intersect each other along straight lines defining the corners of this space. The interconnected rods include a plurality of longitudinal corner rods a1, a2, . . . whose axes respectively coincide with the straight lines at the intersections of the longitudinal planes, so that each of these longitudinal planes contains the axes of two of the longitudinal corner rods a1, a2 . . . . The plurality of interconnected rods also include a plurality of groups of transverse rods b1, b2, c1, c2, d1, . . . , each rod of which consists of an intermediate main longitudinal portion and a pair of opposed free end portions, these groups respectively having the axes of the intermediate main longitudinal portions of the rods thereof situated in the longitudinal planes, while each transverse rod extends transversely between and has its opposed free end portions respectively extending perpendicularly across and directly fused to the two longitudinal rods whose axes are in the plane which contains the axis of the main intermediate portion of the transverse rod. The longitudinal corner rods extend between the free end portions of the transverse rods, and the free end portions of each transverse rod extend angularly with respect to its main intermediate portion outwardly away from the space without passing through any of the longitudinal planes which define this space. The group of transverse rods located in at least one of the longitudinal planes are longitudinally aligned with the group of transverse rods in a longitudinal plane which intersects this one plane, forming pairs of aligned transverse rods respectively having adjoining pairs of free end portions separated by and fused to the longitudinal corner rod whose axis coincides with the intersection between the latter planes. All of the free end portions of all of the transverse rods are located in planes perpendicular to the longitudinal planes with each of the adjoining pairs of free end portions located in a common plane perpendicular to the longitudinal planes.

According to the method of the invention, the longitudinal corner rods whose axes coincide with the intersections between the longitudinal planes which define the elongated space surrounded by the assembly of rods are fed longitudinally in a stepwise manner while the transverse rods are fed from suitable magazines toward the longitudinal rods, the free end portions of the transverse rods extending from the main intermediate portions thereof in a direction opposite to the feeding direction of the transverse rods. The transverse rods upon being fed from their magazines are held against the longitudinal rods with the free end portions of the transverse rods extending perpendicularly across the longitudinal rods. While these transverse rods are thus held with a suitable pressure against the longitudinal rods the resistance welding current is directed through the transverse and longitudinal rods which press against each other so that at the localized areas where the transverse rods engage the longitudinal rods the transverse and longitudinal rods are directly fused to each other as a result of the resistance welding, thus providing the equivalent of an integral connection between the longitudinal and transverse rods.

What I claim is:

1. A rod assembly comprising a plurality of interconnected rods surrounding an elongated space of uniform polygonal cross section defined by a plurality of longitudinal planes which intersect each other along straight lines which define corners of said space, said plurality of interconnected rods including a plurality of longitudinal corner rods respectively having axes coinciding with said straight lines at the intersections of said longitudinal planes, so that each plane contains the axes of two of said longitudinal corner rods, and said plurality of interconnected rods including a plurality of groups of transverse rods each transverse rod of which consists of an intermediate main longitudinal portion and a pair of opposed free end portions, said groups respectively having the axes of said intermediate main longitudinal portions of the rods thereof situated in said longitudinal planes, and each transverse rod extending transversely between and having its opposed free end portions respectively extending perpendicularly across and directly fused to the two longitudinal rods whose axes are contained by the plane which contains the axis of the intermediate main portion of the transverse rod, said longitudinal rods extending between said free end portions of said transverse rods and said free end portions of each transverse rod extending angularly with respect to its intermediate main portion outwardly away from said space without passing through any of said longitudinal planes, at least some of the group of transverse rods in at least one of said longitudinal planes being longitudinally aligned with at least some of the group of transverse rods in a longitudinal plane intersecting said one longitudinal plane to form pairs of aligned transverse rods which respectively have adjoining pairs of free end portions separated by and fused to the longitudinal corner rod whose axis coincides with the intersection between the latter two planes, and all of the free end portions of all of the transverse rods extending perpendicularly across the longitudinal rods with each of said adjoining pairs of free end portions located in a common plane perpendicular to said longitudinal planes.

2. The combination of claim 1 and wherein said longitudinal rods have a larger cross sectional area than said transverse rods.

3. The combination of claim 1 and wherein all of said rods are solid.

4. The combination of claim 1 and wherein said longitudinal rods are of circular cross section.

5. The combination of claim 1 and wherein said transverse rods are of circular cross section.

6. The combination of claim 1 and wherein all of said rods are of circular cross section.

7. The combination of claim 1 and wherein at least some of the rods of at least one group have their opposed free end portions longitudinally displaced one with respect to the other along said space.

8. The combination of claim 1 and wherein at least some of the transverse rods of at least one group extend in their entirety perpendicularly with respect to said longitudinal rods.

9. The combination of claim 1 and wherein at least some successive pairs of transverse rods of at least one group have adjoining free end portions located closely adjacent to each other and intermediate main portions which diverge away from their adjoining free end portions.

10. The combination of claim 1 and wherein at least one group of transverse rods is made up of some transverse rods which extend in their entirety perpendicularly with respect to said longitudinal rods and other transverse rods which are situated between the said one rods, respectively, with said other rods having their opposed free end portions longitudinally displaced with respect to each other along said space and respectively located adjacent said one rods.

11. The combination of claim 10 and wherein said other rods are all identically oriented to define substantially N-shaped arrangements with said one rods.

12. A method of manufacturing a rod assembly comprising the steps of longitudinally advancing in a stepwise manner a plurality of longitudinal corner rods which respectively have axes coinciding with the intersections between a plurality of longitudinal planes which define an elongated space of uniform polygonal cross section, feeding transversely toward said space a plurality of transverse rods each of which has an intermediate main longitudinal portion and a pair of opposed free end portions extending angularly from said intermediate main longitudinal portion in a direction opposite to the feeding direction, holding said transverse rods against said longitudinal rods with the axes of said intermediate main portions of said transverse rods respectively located in said longitudinal planes and with said free end portions of said transverse rods extending perpendicularly across said longitudinal rods with the latter extending between said free end portions of said transverse rods, while applying a given pressure with which said free end portions of said transverse rods are held against said longitudinal rods, and directing through all of said rods at the localized areas where they are pressed against each other a resistance welding current which directly fuses all of said rods to each other so as to provide the equivalent of an integral connection between all of said rods.

References Cited

UNITED STATES PATENTS

| | | | |
|---|---|---|---|
| 774,355 | 11/1904 | Given | 52—655 |
| 1,675,188 | 6/1928 | Macomber | 52—655 |
| 2,565,875 | 8/1951 | Musacchia | 52—695 |

FOREIGN PATENTS

| | | |
|---|---|---|
| 1,308,534 | 9/1962 | France. |
| 169,778 | 6/1921 | Great Britain. |

FRANK L. ABBOTT, *Primary Examiner.*

R. S. VERMUT, *Assistant Examiner.*